United States Patent
Rentschler et al.

(10) Patent No.: US 8,393,048 B2
(45) Date of Patent: Mar. 12, 2013

(54) METHOD FOR CLEANING TWO FILTERS OF A SUCTION DEVICE FOR CLEANING PURPOSES AND SUCTION DEVICE FOR PERFORMING THE METHOD

(75) Inventors: Werner Rentschler, Waiblingen (DE); Rainer Engelhardt, Leutenbach (DE); Juergen Frank, Kirchberg (DE); Daniel Eckstein, Winnenden (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 13/269,652

(22) Filed: Oct. 10, 2011

(65) Prior Publication Data

US 2012/0090640 A1    Apr. 19, 2012

Related U.S. Application Data

(63) Continuation of application No. PCT/EP2009/054851, filed on Apr. 22, 2009.

(51) Int. Cl.
A47L 5/00 (2006.01)

(52) U.S. Cl. .............. 15/319; 15/300.1; 15/347; 15/352; 134/21; 134/10; 55/302

(58) Field of Classification Search .............. 15/300.1, 15/319, 347, 352; 55/283, 301, 302; 134/21, 134/10
See application file for complete search history.

(56) References Cited

U.S. PATENT DOCUMENTS

| | | | |
|---|---|---|---|
| 2,591,567 A | 4/1952 | Lofgren et al. | |
| 3,325,979 A | 6/1967 | Smith | |
| 3,363,764 A | 1/1968 | Whitaker | |
| 3,396,516 A | 8/1968 | Ballard | |
| 3,431,709 A | 3/1969 | Kawanami | |
| 3,498,030 A | 3/1970 | Wilki | |
| 3,509,394 A | 4/1970 | Heidtmann | |
| 3,536,094 A | 10/1970 | Manley, Jr. | |
| 3,731,465 A | 5/1973 | Ohira et al. | |
| 3,748,836 A | 7/1973 | Bachle | |
| 3,792,569 A | 2/1974 | Carlson et al. | |
| 3,868,237 A | 2/1975 | Berz | |
| 3,945,390 A | 3/1976 | Huber | |
| 3,951,623 A | 4/1976 | Furstenberg | |
| 3,994,067 A | 11/1976 | Hazzard et al. | |
| 4,033,732 A | 7/1977 | Axelsson et al. | |
| 4,124,915 A | 11/1978 | Schlicher | |
| 4,124,916 A | 11/1978 | Fromknecht | |

(Continued)

FOREIGN PATENT DOCUMENTS

| DE | 210 658 | 6/1909 |
|---|---|---|
| DE | 276953 | 7/1914 |

(Continued)

*Primary Examiner* — Alexander Markoff
(74) *Attorney, Agent, or Firm* — Lipsitz & McAllister, LLC

(57) ABSTRACT

A method for cleaning first and second filters of a suction device for cleaning purposes is provided. The suction device has a dirt collection container with a suction inlet. The dirt collection container is subjected to negative pressure via first and second suction lines, respectively, following the first and second filters. First and second closing valves close first and second external air inlets, respectively, into the first and second suction lines. For cleaning the filters, the closing valves are opened, subjecting the filters to external air on the clean space side. The dirt collection container is subjected to negative pressure via the first suction line and first filter by a first suction unit and via the second suction line and second filter by a second suction unit. The suction lines are sealed off relative to each other on the clean space side at least during the cleaning of the filters.

19 Claims, 5 Drawing Sheets

U.S. PATENT DOCUMENTS

| | | | |
|---|---|---|---|
| 4,171,208 | A | 10/1979 | Lowder |
| 4,277,265 | A | 7/1981 | Leinfelt |
| 4,329,161 | A | 5/1982 | Osborn |
| RE31,417 | E | 10/1983 | Huber |
| 4,482,129 | A | 11/1984 | Baker et al. |
| 4,581,135 | A | 4/1986 | Gerulis |
| 4,719,662 | A | 1/1988 | Horak et al. |
| 4,733,326 | A | 3/1988 | Harsch et al. |
| 4,921,510 | A | 5/1990 | Plooy |
| 5,002,594 | A | 3/1991 | Merritt |
| 5,178,652 | A | 1/1993 | Hüttlin |
| 5,217,509 | A | 6/1993 | Jansen |
| 5,246,205 | A | 9/1993 | Gillingham et al. |
| 5,322,534 | A | 6/1994 | Kaiser |
| 5,368,060 | A | 11/1994 | Worrall et al. |
| 5,369,839 | A | 12/1994 | Wörwag |
| 5,511,583 | A | 4/1996 | Bassett |
| 5,882,180 | A | 3/1999 | Kawaguchi et al. |
| 5,951,746 | A | 9/1999 | Treitz et al. |
| 5,975,062 | A | 11/1999 | Bonse et al. |
| 6,406,505 | B1 | 6/2002 | Oh et al. |
| 6,440,191 | B1 | 8/2002 | Berfield et al. |
| 6,458,178 | B1 | 10/2002 | Dietz et al. |
| 6,517,325 | B2 | 2/2003 | Tsuru et al. |
| 6,640,385 | B2 | 11/2003 | Oh et al. |
| 6,782,583 | B2 | 8/2004 | Oh |
| 6,936,161 | B2 | 8/2005 | Wright et al. |
| 7,082,640 | B2 | 8/2006 | McCutchen |
| 7,340,797 | B2 | 3/2008 | Theiss, Jr. et al. |
| 7,647,672 | B2 | 1/2010 | Nam et al. |
| 7,861,367 | B2 | 1/2011 | Eckstein et al. |
| 7,947,099 | B2 | 5/2011 | Valentini |
| 7,976,614 | B2 | 7/2011 | Eckstein et al. |
| 8,015,660 | B2 | 9/2011 | Bruntner |
| 2002/0066262 | A1 | 6/2002 | Oh |
| 2002/0088078 | A1 | 7/2002 | Oh et al. |
| 2002/0124729 | A1 | 9/2002 | Dudley |
| 2003/0041729 | A1 | 3/2003 | Finigan |
| 2003/0167590 | A1 | 9/2003 | Oh |
| 2005/0011036 | A1* | 1/2005 | McCutchen ............... 15/319 |
| 2005/0251953 | A1 | 11/2005 | Hackwell et al. |
| 2005/0254270 | A1 | 11/2005 | Melchert et al. |
| 2008/0086835 | A1 | 4/2008 | Stewen et al. |
| 2008/0092498 | A1 | 4/2008 | Stewen et al. |
| 2009/0000485 | A1 | 1/2009 | Valentini |
| 2009/0027823 | A1 | 1/2009 | Follic et al. |
| 2009/0106933 | A1 | 4/2009 | Bruntner |
| 2009/0205158 | A1 | 8/2009 | Eckstein et al. |
| 2009/0205159 | A1 | 8/2009 | Stewen et al. |
| 2009/0205491 | A1 | 8/2009 | Eckstein et al. |
| 2009/0205499 | A1 | 8/2009 | Eckstein et al. |

FOREIGN PATENT DOCUMENTS

| | | |
|---|---|---|
| DE | 338942 | 7/1921 |
| DE | 1 245 550 | 7/1967 |
| DE | 1 407 945 | 11/1968 |
| DE | 1 800 480 | 6/1970 |
| DE | 1 844 732 | 1/1971 |
| DE | 2 102 231 | 7/1971 |
| DE | 2 106 058 | 9/1971 |
| DE | 2 416 071 | 10/1974 |
| DE | 91 04 127 | 7/1991 |
| DE | 41 38 223 | 2/1993 |
| DE | 197 01 983 | 6/1998 |
| DE | 298 23 411 | 5/1999 |
| DE | 199 49 095 | 4/2001 |
| DE | 200 10 608 | 12/2001 |
| DE | 100 56 935 | 2/2002 |
| DE | 101 40 351 | 6/2002 |
| DE | 101 01 219 | 7/2002 |
| DE | 101 50 257 | 7/2002 |
| DE | 102 40 618 | 9/2003 |
| DE | 695 30 326 | 5/2004 |
| DE | 20 2004 012 911 | 11/2004 |
| DE | 10 2005 029 606 | 1/2006 |
| DE | 10 2004 056 076 | 5/2006 |
| DE | 10 2005 017 568 | 10/2006 |
| DE | 10 2005 017 702 | 10/2006 |
| DE | 10 2005 035 884 | 2/2007 |
| DE | 20 2007 015 242 | 1/2008 |
| EP | 0 289 987 | 11/1988 |
| EP | 0 197 036 | 3/1990 |
| EP | 0 955 003 | 11/1999 |
| EP | 0 873 075 | 2/2000 |
| EP | 1 166 705 | 1/2002 |
| EP | 1 340 446 | 9/2003 |
| EP | 1 656 872 | 5/2006 |
| EP | 1 743 562 | 1/2007 |
| EP | 1 913 857 | 4/2008 |
| EP | 1 997 415 | 12/2008 |
| GB | 956764 | 4/1964 |
| GB | 2 337 922 | 12/1999 |
| JP | 08038401 | 2/1996 |
| JP | 2002028107 | 1/2002 |
| JP | 2006181228 | 7/2006 |
| SU | 644513 | 1/1979 |
| WO | 85/02528 | 6/1985 |
| WO | 95/10972 | 4/1995 |
| WO | 95/27431 | 10/1995 |
| WO | 97/19630 | 6/1997 |
| WO | 01/74493 | 10/2001 |
| WO | 2004/100752 | 11/2004 |
| WO | 2005/006934 | 1/2005 |
| WO | 2006/108459 | 10/2006 |
| WO | 2008/014794 | 2/2008 |
| WO | 2008/014795 | 2/2008 |
| WO | 2008/014796 | 2/2008 |
| WO | 2008/014797 | 2/2008 |
| WO | 2008/014798 | 2/2008 |

* cited by examiner

METHOD FOR CLEANING TWO FILTERS OF A SUCTION DEVICE FOR CLEANING PURPOSES AND SUCTION DEVICE FOR PERFORMING THE METHOD

This application is a continuation of international application number PCT/EP2009/054851 filed on Apr. 22, 2009.

The present disclosure relates to the subject matter disclosed in international application number PCT/EP2009/054851 of Apr. 22, 2009, which is incorporated herein by reference in its entirety and for all purposes.

BACKGROUND OF THE INVENTION

The invention relates to a method for cleaning a first filter and a second filter of a suction device for cleaning purposes, which comprises a dirt collection container with a suction inlet, wherein the dirt collection container is subjected to negative pressure via the first filter and the second filter and a first suction line and a second suction line, respectively, following the first filter and the second filter, wherein a first closing valve and a second closing valve close a first external air inlet and a second external air inlet, respectively, into the first suction line and the second suction line, respectively, and wherein to clean the first filter and the second filter, the first closing valve and the second closing valve, respectively, are opened, in order to subject the first filter and the second filter, respectively, to external air on the clean space side.

The invention also relates to a suction device for cleaning purposes with a dirt collection container, which comprises a suction inlet, the suction device comprising at a first suction outlet a first filter and at a second suction outlet a second filter, which are followed by a first suction line and a second suction line, respectively, via which the dirt collection container can be subjected to negative pressure, and the suction device comprising a first external air inlet and a second external air inlet, via which external air can flow into the first suction line and into the second suction line, respectively, in order to subject the first filter and the second filter, respectively, to external air on the clean space side, and which are closable by a first closing valve and a second closing valve, respectively.

Such a suction device, with which the above method may be performed, is described in US 2005/0011036 A1 in the form of a vacuum cleaner. The vacuum cleaner comprises two or more filters, with each of which there are associated a suction line and a closing valve connected into the latter for selective admission of external air via external air inlets. The suction lines open into one another and can be subjected to negative pressure by a suction unit. During normal suction operation, the external air inlets are closed by the closing valves, and the dirt collection container is subjected to negative pressure via all of the suction lines. This allows suction material such as, for example, dirt or liquids to be sucked in at the free end of a suction hose connectable to the suction inlet and deposited in the dirt collection container. During continuous suction operation, particles of dirt may settle on the filters and clog these, which results in a rise in the pressure in the dirt collection container and, consequently, in reduced suction power of the vacuum cleaner.

To clean one of the filters, US 2005/0011036 A1 proposes opening the external air inlet of the associated suction line by means of the associated closing valve, whereas the external air inlets at the remaining suction lines remain closed by the further closing valves. External air, for example, at atmospheric pressure, can flow through the open external air inlet into the suction line and act upon the filter to be cleaned on the clean space side. Owing to the difference between the pressure of the external air and the pressure of the air in the dirt collection container, the filter to be cleaned experiences a pressure surge, as a result of which particles of dirt are dislodged from the filter and deposited in the dirt collection container. The external air can continue to flow through the filter to be cleaned and enter the dirt collection container, from which it can be sucked off via the remaining filters and the suction lines associated with these by means of the suction unit. After that the closing valve can be closed and, if required, a further closing valve opened, in order to clean a further filter.

In the method described in US 2005/0011036 A1, it has proven disadvantageous that both the external air that has entered the dirt collection container via the open external air inlet and the filter to be cleaned and the suction air drawn in through the suction hose have to be sucked off by the suction unit. When external air flows into the dirt collection container, this brings about an uncontrollable rise in pressure in it. In practice, this may result in the negative pressure provided by the vacuum cleaner at the free end of the suction hose no longer being adequate to suck in suction material.

This problem occurs, in particular, with suction hoses having a relatively large diameter, in particular, larger than 40 mm and, for example, 60 mm. Such suction hoses are used, for example, when vacuuming machining tools, in particular, drilling, milling or sawing units.

Particularly large suction cross sections of the suction inlet are present in suction devices in the form of vacuum sweepers, in which the uncontrollable rise in pressure in the dirt collection container has also proven disadvantageous.

The object of the present invention is to develop a generic method and a generic suction device so as to obtain a better suction result.

SUMMARY OF THE INVENTION

This object is accomplished in a method of the kind mentioned at the outset, in accordance with the invention, in that the dirt collection container is subjected to negative pressure via the first suction line and the first filter by a first suction unit of the suction device and via the second suction line and the second filter by a second suction unit of the suction device, and the first suction line and the second suction line are sealed off relative to each other on the clean space side at least during the cleaning of the first filter and the second filter.

With the method in accordance with the invention, the first filter, as described above, can be cleaned by the first closing valve being actuated. External air can flow into the first suction line through the first external air inlet and act upon the first filter on the clean space side. In practice, the pressure surge resulting from this action on the first filter has proven effective in dislodging particles of dirt from the first filter and depositing these in the dirt collection container. By comparison, a continuous flow of air from the first suction line into the dirt collection container, occurring as a result of the difference between the pressure in the dirt collection container and the pressure in the first suction line, is of less importance for the cleaning result.

Owing to the fact that the first suction unit of the suction device is connected into the first suction line, external air flowing into the first suction line is to a large extent sucked out of the first suction line by the first suction unit after the occurrence of the pressure surge. External air which flows from the first suction line through the first filter into the dirt collection container can be sucked out of the dirt collection container again by the second suction unit of the suction device, which is connected into the second suction line. The sealing between the first suction line and the second suction line ensures that the dirt collection container continues to be subjected to negative pressure by the second suction unit, so that suction operation can be maintained by the second suction unit. Owing to the fact that the proportion of external air entering the dirt collection container during the cleaning process can be reduced by use of the first suction unit, a smaller rise in pressure occurs in the dirt collection container during the cleaning of the filter than with the generic method. Therefore, a greater negative pressure is available at the suction inlet, and so a better suction result is achieved.

After the first filter has been cleaned, the first closing valve can be actuated, if this is required, in order to close the first external air inlet. The second filter can be cleaned in a manner corresponding to that described above for the first filter by the second closing valve being actuated, so that external air can flow through the second external air inlet into the second suction line. In this case, too, the use of two suction units and the sealing between the first suction line and the second suction line at least during the cleaning of the second filter ensure that after the pressure surge cleaning the second filter, external air that has flowed in is sucked off to a large extent by the second suction unit. External air that flows into the dirt collection container from the second suction line can be sucked off by the first suction unit through the first filter and the first suction line. In comparison with the generic method, in this case, too, a lower rise in pressure occurs in the dirt collection container and, consequently, there is a higher negative pressure at the suction inlet, which leads to a better suction result.

The "sealing" of the first suction line relative to the second suction line at least during the cleaning of the first and second filters is, in this instance, not to be understood in the sense that any gas exchange between the first suction line and the second suction line even on the molecular level is prevented. Within the scope of the method in accordance with the invention it is adequate for the sealing to be of such a nature that no significant gas exchange takes place between the first suction line and the second suction line at the gas pressures that normally occur during operation of a suction device.

The suction device may comprise more than two filters, optionally with suction lines associated with these. It may be provided that the further filters are also cleaned as described above. The first and second filters, optionally also further filters, may be separate components or independent filter areas of a filter device.

It may be provided that during normal suction operation of the suction device, i.e., when the first filter or the second filter is not being cleaned, a fluidic connection exists between the first suction line and the second suction line. During the cleaning of the filters, this connection can be closed, for example, by a valve, such as a flap valve, solenoid valve or slide valve, in order to ensure the sealing.

It is expedient for the first suction line and the second suction line to be permanently sealed off relative to each other on the clean space side. This enables the method to be performed in a simpler way. In particular, it is not necessary to provide a sealing-off of the suction lines relative to each other when changing over from normal suction operation of the suction device to cleaning the filters. In this way, a suction device performing the method can manage with a smaller number of active elements.

The first closing valve and the second closing valve are preferably actuated at different points in time. It can thereby be ensured that when the first closing valve is actuated, which results in external air flowing into the first suction line, external air does not simultaneously flow into the second suction line owing to the second closing valve also being actuated. This would result in an undesired excessive rise in pressure in the dirt collection container, which can thus be avoided by the first closing valve and the second closing valve being actuated at different points in time.

For the same reason, it is advantageous for the first closing valve and the second closing valve not to be open at the same point in time. It is, on the contrary, expedient if at a certain point in time either only the first closing valve or the second closing valve is open in order to allow external air to flow into either the first suction line or the second suction line to clean either the first filter or the second filter.

The first closing valve and/or the second closing valve are preferably actuated at prescribable intervals. This makes it possible to clean the first filter and/or the second filter of particles of dirt at prescribable intervals. In this way, suction power losses owing to a first filter and/or a second filter being clogged with particles of dirt can be reduced, thereby enabling a better suction result to be obtained.

When performing the method, it has, in practice, proven expedient for the first filter and the second filter to be alternately cleaned at intervals of approximately 10 to 30 seconds, and, preferably, approximately 15 seconds, in each case.

It is advantageous for the first closing valve and/or the second closing valve to be opened for prescribable periods of time. It is thus possible to allow external air to flow into the first suction line and/or the second suction line for a prescribable period of time, so that cleaning of the first filter and/or the second filter can take place during the prescribable periods of time. The periods of time may differ in length for the first closing valve and the second closing valve and depend, for example, on the degree of soiling of the filter to be cleaned. When performing the method, it has, in practice, proven expedient for the first and second closing valves to be open for approximately 50 to 200 and, preferably, approximately 100 milliseconds, in each case. Valves with which such closing times can be achieved are described, for example, in the international patent applications of the same applicant, which are published under numbers WO 2008/014794 A1 and WO 2006/108459 A1 and are hereby incorporated in their entirety in this application.

The first closing valve and/or the second closing valve are advantageously actuated electronically. It can thereby be ensured that the method functions reliably. The suction device may comprise a control unit for controlling the first closing valve and/or the second closing valve. It is, for example, possible to prescribe actuation intervals and opening durations of the first closing valve and/or the second closing valve with it.

Preferably, the first closing valve and/or the second closing valve are actuated in dependence upon a pressure difference forming between the first suction line and the dirt collection container and between the second suction line and the dirt collection container, respectively, while the first closing valve and the second closing valve, respectively, are closed. When particles of dirt accumulate on the first filter and/or on the second filter, the pressure difference between the dirt collection container and the first suction line and between the dirt collection container and the second suction line, respectively, rises. It may be provided that the first closing valve and/or the second closing valve are actuated when this pressure difference exceeds a prescribable amount. It is thereby ensured that the first filter and/or the second filter will be cleaned of particles of dirt in good time, so that a better overall suction result is obtained. For performance of the method, the suction device may be equipped with pressure sensors, for example, in the dirt collection container, in the first suction line and in the second suction line. The pressure sensors can transmit their measurement values to a control unit, which then actuates the first closing valve and/or the second closing valve as needed.

As mentioned above, the invention also relates to a suction device for cleaning purposes, in particular, for cleaning floors, for example, in the form of a vacuum cleaner or a vacuum sweeper. In a suction device of the kind mentioned at the outset, the object underlying the invention is accomplished, in accordance with the invention, in that the suction device comprises a first suction unit for subjecting the dirt collection container to negative pressure via the first suction line and the first filter and comprises a second suction unit for subjecting the dirt collection container to negative pressure via the second suction line and the second filter, and in that the first suction line and the second suction line are sealed off relative to each other on the clean space side at least during the cleaning of the first filter and the second filter.

It is possible to perform the method in accordance with the invention as explained above with the suction device in accordance with the invention. The suction device, therefore, has the advantages mentioned above in conjunction with the explanation of the method in accordance with the invention. If, for example, for cleaning purposes, the first filter is subjected to external air on the clean space side, this external air is substantially sucked out of the first suction line by the first suction unit. External air that flows from the first suction line into the dirt collection container can be sucked off via the second filter and the second suction line by the second suction unit. For this reason, the pressure in the dirt collection container rises only slightly when the first filter is being cleaned, with the result that sufficient negative pressure can be provided at the suction inlet. The preceding statement applies accordingly to the cleaning of the second filter. An improved suction result is, therefore, obtained with the suction device in accordance with the invention.

As mentioned above, the suction device may comprise more than two filters, which may be independent components or independent filter areas of a filter device.

It is expedient for the first suction line and the second suction line to be permanently sealed off relative to each other. This enables a simple design of the suction device. In particular, it is not necessary to provide active elements such as, for example, valves which, when cleaning the first filter and the second filter, close a fluidic connection existing between the first suction line and the second suction line during normal suction operation.

A constructionally simple, permanent sealing-off of the suction lines relative to each other can be achieved by the first suction line and the second suction line being configured as suction channels that are spatially separated from each other.

The suction device preferably comprises a housing with a first housing part, which at least partially forms the first suction line and/or the second suction line. This enables a constructionally simple design of the suction device. The housing of the suction device and, in particular, its first housing part may, for example, be of one-piece configuration and be made of a plastic material. It is possible that the first housing part forms at least partially walls of the first suction line and/or the second suction line.

The suction device preferably comprises a housing with a second housing part, which at least partially forms a wall of at least one external air channel, which opens via the first external air inlet into the first suction line and/or via the second external air inlet into the second suction line. This enables a simple constructional design of the suction device. The second housing part, which, for example, is of one-piece configuration and may be formed by a molded plastic part, can be arranged on the remaining housing of the suction device in such a way that an external air channel is defined between the remaining housing and the second housing part. The second housing part forms at least partially a wall of the external air channel through which external air can flow into the first suction line when the first closing valve is open and external air can flow into the second suction line when the second closing valve is open.

It is advantageous for the first closing valve and/or the second closing valve to be held on the second housing part, which is transferable from an operating position in which the second housing part covers the first filter and/or the second filter to a maintenance position in which the first filter and/or the second filter are freely accessible, and vice versa. This enables easy maintenance of the suction device. It may occasionally be necessary to exchange the first filter and/or the second filter. With the present embodiment, this may be done by the second housing part being transferred together with the first closing valve and/or the second closing valve held thereon from the operating position to the maintenance position, so that the first filter and/or the second filter are freely accessible to a user. After the appropriate filter has been exchanged, the second housing part can be transferred back to the operating position again and suction operation continued.

It can be ensured that the first closing valve and/or the second closing valve will function reliably by the first closing valve and/or the second closing valve having fixed to the device a first valve seat and a second valve seat, respectively, and a first valve body and a second valve body, respectively, which are movable relative to the first valve seat and the second valve seat, respectively, and which, in a closed position, sealingly engage the first valve seat and the second valve seat, respectively, and, in an open position, are lifted off from the first valve seat and from the second valve seat, respectively. Here the first valve seat and/or the second valve seat form the first external air inlet and the second external air inlet, respectively.

The first closing valve and/or the second closing valve preferably comprise a first restoring member and a second restoring member, respectively, counter to the action of which the first valve body and the second valve body, respectively, are transferable from the closed position to the open position. In the closed position, the first valve body and/or the second valve body assume a normal position. The application of force is required to transfer the first valve body and/or the second valve body to the open position and to thereby enable external air to flow into the first suction line and the second suction line, respectively. The application of force may, for example, occur as a result of the difference in pressure between the external air at atmospheric pressure and the air in the first suction line and the second suction line, respectively, at negative pressure.

To ensure that, in this case, the first closing valve and/or the second closing valve will not open automatically on account of the pressure difference, it is advantageous for the first closing valve and/or the second closing valve to comprise a first electromagnet and a second electromagnet, respectively, by the action of which the first valve body and the second valve body, respectively, are held in the closed position. During normal suction operation of the suction device, the electromagnet of the first closing valve and/or the second closing valve may be switched on in order to hold the first valve body and the second valve body, respectively, in the closed position. To clean the first filter and/or the second filter, the electromagnet can be switched off, so that the first valve body and the second valve body, respectively, are transferred from the closed position to the open position and external air can flow in. Owing to the resulting pressure compensation between the atmospheric pressure and the pressure in the first suction line and/or the second suction line, the first valve body and the second valve body, respectively, can be transferred by the first restoring member and the second restoring member, respectively, from the open position to the closed position again. The electromagnet can then be switched on again, and normal suction operation resumed.

The suction device preferably comprises a control unit in electrical connection with the first closing valve and/or the second closing valve, with which control unit the first closing valve and the second closing valve, respectively, are controllable. It can thereby be ensured that the suction device will function reliably. By means of the control unit, the first closing valve and/or the second closing valve can, for example, be actuated at prescribable intervals or opened for prescribable periods of time. Reliable cleaning of the first filter and/or the second filter in accordance with requirements is thereby achieved.

As mentioned above, it may be provided that the suction device comprises pressure sensors in the dirt collection container and/or and in the first suction line and/or in the second suction line, which are in communication with the control unit, and on the basis of the measurement values of which the first closing valve and/or the second closing valve are actuated.

It is expedient for the first suction unit and the second suction unit and/or the first suction line and the second suction line and/or the first closing valve and the second closing valve to be arranged symmetrically relative to each other on the suction device in relation to a central longitudinal plane of the suction device. A symmetrical arrangement of as many components of the suction device as possible enables arrangement of its centre of mass as close as possible to the central longitudinal plane and preferably in the central longitudinal plane. It has been found that improved stability and quiet running of the suction device are thereby achieved.

The following description of preferred embodiments of the invention serves for a more detailed explanation of the invention in conjunction with the drawings.

DETAILED DESCRIPTION OF THE INVENTION

Figure 1:
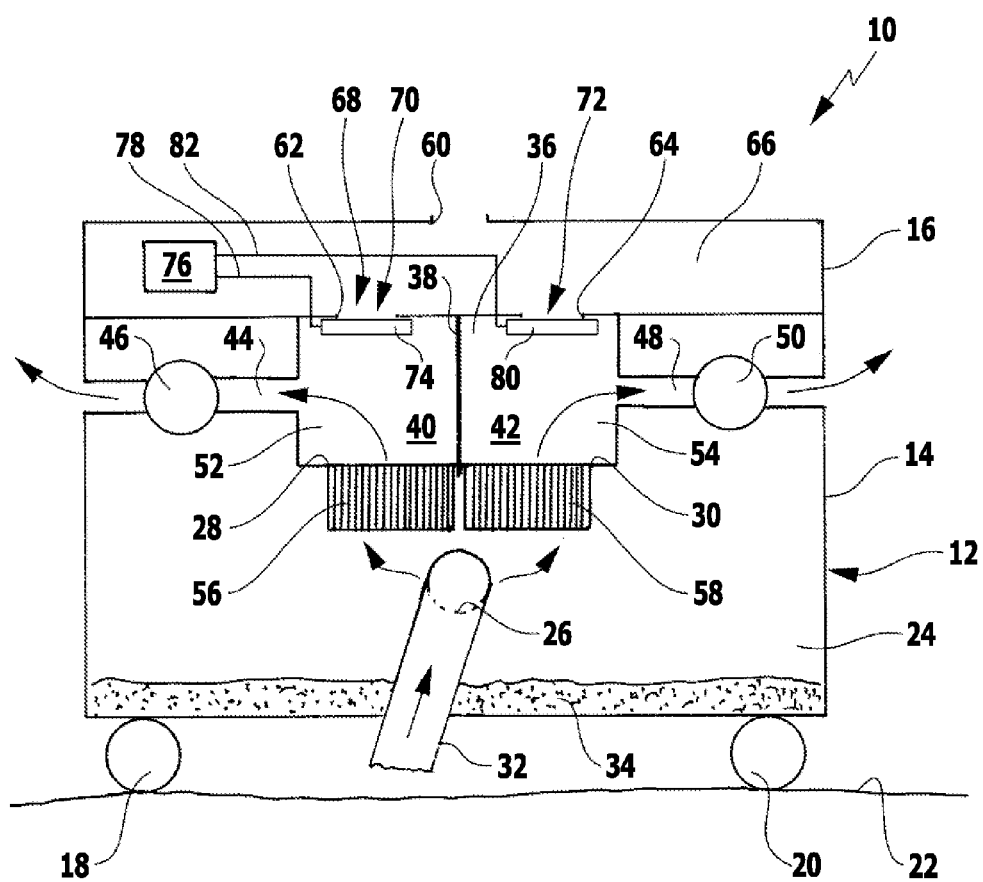
FIG. 1 shows a diagrammatic representation of a first preferred embodiment of a suction device in accordance with the invention during normal suction operation.
Figure 2:
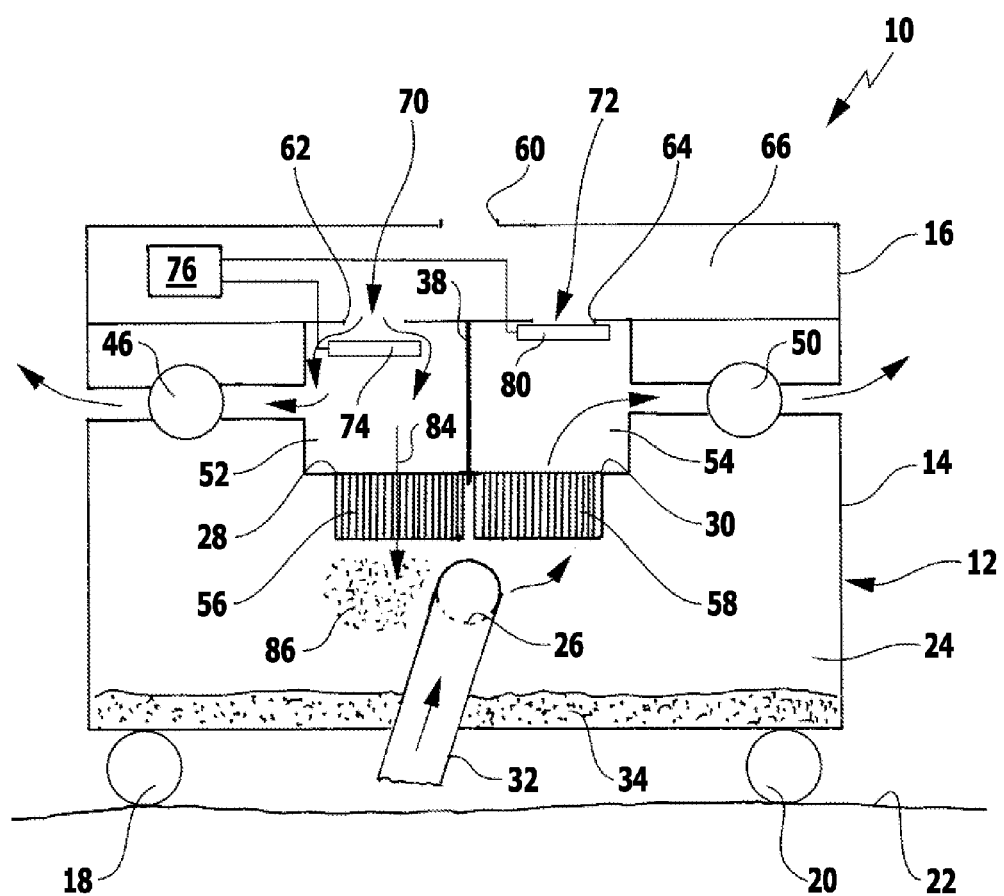
FIG. 2 shows the suction device from FIG. 1 while a first filter is being cleaned.
Figure 3:
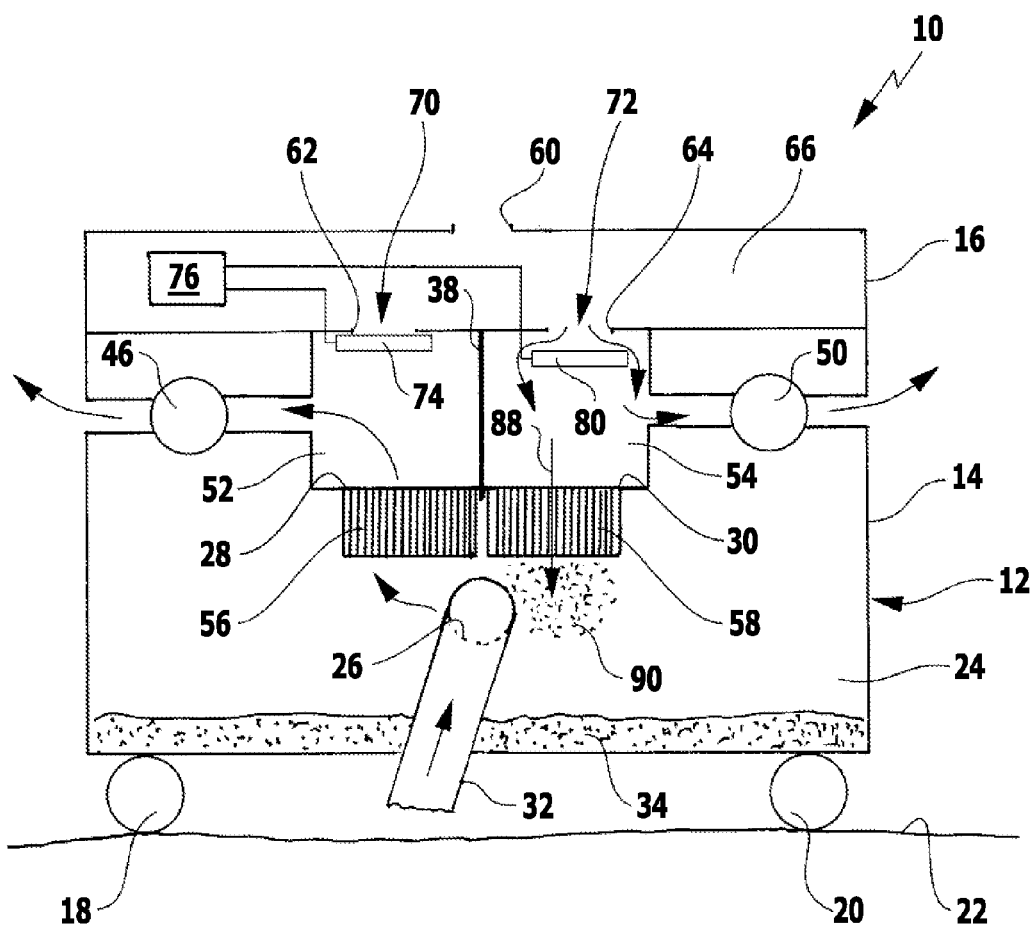
FIG. 3 shows the suction device from FIG. 1 while a second filter is being cleaned.

A first preferred embodiment of a suction device in accordance with the invention in the form of a vacuum cleaner is represented diagrammatically in FIGS. 1 to 3 and denoted therein by reference numeral 10. The vacuum cleaner 10 comprises a housing 12 with a lower housing part 14 and an upper housing part 16 fitted thereon. Rollers 18 and 20 serving to move the vacuum cleaner 10 on a set-down surface 22 are held on the lower housing part 14.

The lower housing part 14 is configured as a hollow body and forms a dirt collection container 24 of the vacuum cleaner 10 with a suction inlet 26 and a first suction outlet 28 and a second suction outlet 30, which are each in the form of a through-opening of the lower housing part 14. Detachably connected to the suction inlet 26 is a suction hose 32, to whose free end, facing away from the dirt collection container 24 and not shown in the drawings, there may be connected, in a known manner and, therefore, not explained in greater detail, a suction tool. The suction tool may, for example, be a floor nozzle or a machining tool such as a drilling, sawing or milling unit. By subjecting the dirt collection container 24 to negative pressure in the manner described hereinbelow, suction material 34 such as, for example, dirt or liquids can be sucked in by the vacuum cleaner 10 through the suction hose 32 and deposited in the dirt collection container 24.

There is formed above the suction outlets 28 and 30 between the lower housing part 14 and the upper housing part 16 a suction chamber 36, which is divided by a vertically extending gas-tight partition wall 38 into a first chamber region 40 and a second chamber region 42. The first chamber region 40 is connected to a first flow channel 44 which is formed in the lower housing part 14 and into which a first suction unit 46 is connected. In a corresponding manner, the second chamber region 42 is connected to a second flow channel 48 which is formed in the lower housing part 14 and into which a second suction unit 50 is connected. The first chamber region 40 and the section of the first flow channel 44 that faces the latter form a first suction line 52, and the second chamber region 42 and the section of the second flow channel 48 that faces the latter form a second suction line 54.

Inserted in the suction outlet 28 is a first filter 56, and inserted in the suction outlet 30 is a second filter 58. The filters 56 and 58 may be, for example, flat pleated filters made of a paper or polyester material. The filters 56 and 58 are separate components. It may be provided that the filters 56 and 58 in a variant of the vacuum cleaner 10 are configured as independent filter areas of a filter device.

The upper housing part 16 is configured as a hollow body. On its upper side it has an entrance opening 60 for air from the atmosphere. On its underside it has a first through-opening designated as first external air inlet 62 and a second through-opening designated as second external air inlet 64. In this way, the upper housing part 16 forms a hollow body designated as external air channel 66, which opens via the entrance opening 60 into the atmosphere, and which opens via the first external air inlet 62 into the first suction line 52 and via the second external air inlet 64 into the second suction line 54.

The vacuum cleaner 10 comprises a valve device 68 with a first closing valve 70 and a second closing valve 72 for closing and enabling the first external air inlet 62 and the second external air inlet 64, respectively. For this purpose, the first closing valve 70 comprises a first valve body 74, which in a closed position sealingly engages the first external air inlet 62 forming a first valve seat at the underside of the upper housing part 16. In the closed position of the first valve body 74, a flow connection between the first suction line 52 and the external air channel 66 is interrupted. By actuating the first closing valve 70, the first valve body 74 can be transferred from the closed position to an open position in which it is lifted off from the first external air inlet 62. In the open position, a flow connection exists between the first suction line 52 and the external air channel 66.

The vacuum cleaner 10 comprises a control unit 76, which is connected via a line 78 to the first closing valve 70, for actuating the first closing valve 70.

In a corresponding manner, the second closing valve 72 comprises a second valve body 80, which can assume a closed position in which it sealingly engages the second external air inlet 64 forming a second valve seat at the underside of the upper housing part 16. In the closed position of the second valve body 80, no flow connection exists between the external air channel 66 and the second suction line 54. By actuating the second closing valve 72, the second valve body 80 can be transferred to an open position in which it is lifted off from the second external air inlet 64. A flow connection can thereby be established between the external air channel 66 and the second suction line 54. The second closing valve 72 can also be actuated by the control unit 76, to which it is connected via a line 82.

During normal suction operation of the vacuum cleaner 10 shown in FIG. 1, the dirt collection container 24 is subjected to negative pressure by the first suction unit 46 through the first suction line 52 and the first filter 56. In a corresponding manner, the dirt collection container 24 is subjected to negative pressure by the second suction unit 50 through the second suction line 54 and the second filter 58. During normal suction operation, the first closing valve 70 and the second closing valve 72 are closed, so that no external air entering the external air channel 66 via the entrance opening 60 can pass through the first external air inlet 62 and the second external air inlet 64 into the first suction line 52 and the second suction line 54, respectively. As mentioned above, suction material 34 can be sucked in through the suction hose 32 into the dirt collection container 24 by the negative pressure in the dirt collection container 24 and deposited there.

During continuous suction operation and, in particular, in the case of high dirt input at the free end of the suction hose 32, particles of dirt may accumulate on the filters 56 and 58 and thereby impair passage of suction air through these. As a result, less suction air can be sucked out of the dirt collection container 24 by the suction units 46 and 50, which causes a rise in pressure in the dirt collection container 24 and reduces the suction effect at the free end of the suction hose 32.

In order to clean the filters 56 and 58, i.e., to remove particles of dirt adhering to them, the procedure can be as follows:

The closing valves 70 and 72 can be actuated by the control unit 76. It is assumed hereinbelow that the first closing valve 70 will be actuated first and the second closing valve 72 subsequently.

When the first closing valve 70 is actuated, the first valve body 74 is transferred from the closed position to the open position (FIG. 2). Since a negative pressure prevails in the first suction line 52 relative to the atmosphere, external air entering the external air channel 66 through the entrance opening 60 can flow through the first external air inlet 62 into the first suction line 52 in order to subject the first filter 56 on the clean space side to external air. The incoming external air leads to a pressure difference between the air in the dirt collection container 24 and the air in the first suction line 52, so that the first filter 56 experiences a pressure surge directed at the dirt collection container 24 and indicated by arrow 84 in FIG. 2. This pressure surge causes particles of dirt 86 adhering to the first filter 56 to be dislodged, which are then deposited in the dirt collection container 24.

The external air flowing into the first suction line 52 is to a large extent sucked off by the first suction unit 46. The proportion of external air flowing in from the first suction line 52 through the first filter 56 into the dirt collection container 24 is by comparison rather small. Apart from that, a permanent flow of external air from the first suction line 52 into the dirt collection container 24 is of less importance for the cleaning of the first filter 56 because the first filter 56 is essentially cleaned by the pressure surge that is generated.

Owing to the relatively small amount of external air entering the dirt collection container 24, only a slight rise in pressure occurs in it particularly since the dirt collection container 24 continues to be subjected to negative pressure by the second suction unit 50. The external air that has entered the dirt collection container 24 can be effectively sucked off from the dirt collection container 24 by the second suction unit 50. The sealing between the first suction line 52 and the second suction line 54 due to the partition wall 38 ensures that external air that has flowed into the first suction line 52 is not directly sucked off by the second suction unit 50, thereby bypassing the dirt collection container 24.

In accordance with the aforesaid, only a relatively low rise in pressure occurs in the dirt collection container 24 during the cleaning of the first filter 56, so that negative pressure can continue to be effectively provided at the suction inlet 26 and hence also at the free end of the suction hose 52. In this way, an improved suction result is achieved.

After the first filter 56 has been cleaned, the first closing valve 70 can be closed, i.e., the first valve body 74 transferred from the open position to the closed position, and normal suction operation continued in the manner shown in FIG. 1.

The second filter 58 can be cleaned (FIG. 3) in a manner corresponding to that described above for the first filter 56. For this purpose, the second closing valve 72 is actuated by the control unit 76, so that the second valve body 80 is lifted off from the second external air inlet 64. External air can flow into the second suction line 54 through the second external air inlet 64 and act upon the second filter 58 on the clean space side. Owing to the pressure difference between the air in the dirt collection container 24 and the air in the second suction line 54, the second filter 58 experiences a pressure surge directed at the dirt collection container 24 and indicated by arrow 88 in FIG. 3, so that particles of dirt 90 adhering to the second filter 58 are dislodged from it and deposited in the dirt collection container 24.

The external air flowing into the second suction line 54 is sucked off to a large extent by the second suction unit 50, and the proportion of external air entering the dirt collection container 24 through the second filter 58 can be sucked out of the dirt collection container 24 by the first suction unit 46. The sealing between the first suction line 52 and the second suction line 54 by means of the partition wall 38 ensures that external air flowing into the second suction line 54 is not directly sucked off by the first suction unit 46, thereby bypassing the dirt collection container 24.

Therefore, during the cleaning of the second filter 58, too, the pressure rises only slightly in the dirt collection container 24, so that negative pressure can be effectively provided at the free end of the suction hose 32, with the result that an overall improved suction result is obtained.

When the vacuum cleaner shown in FIGS. 1 to 3 is implemented, it has proven advantageous for the filters 56 and 58 to be cleaned at regular intervals of approximately 10 to 30 seconds and, preferably, approximately 15 seconds. The closing valves 70 and 72 are preferably open for approximately 50 to 200 milliseconds, and, even more preferably, approximately 100 milliseconds. They are preferably electromagnetically actuatable or configured as solenoid valves which are electronically controllable by the control unit 76. Such a closing valve with which opening times of approximately 100 milliseconds can be implemented is described, for example, in international patent applications of the same applicant, which are published under numbers WO 2008/014794 A1 and WO 2006/108459 A1. The contents of these published international applications are incorporated in the present patent application.

A variant of the vacuum cleaner 10 may comprise more than two filters. It may be provided that the further filters can also be cleaned as described above.

In the present case, the closing valves 70 and 72 are held on the upper housing part 16, which in the drawings assumes an operating position in which the filters 56 and 58 are covered by the upper housing part 16. The upper housing part 16 may be removed from the lower housing part 14 in a simple way, not shown in the drawings, i.e., transferred to a maintenance position. In the maintenance position, a user can reach into the suction chamber 36, so that the filters 56 and 58 are freely accessible. This enables simple exchange of the filters 56 and 58. After a new filter has been inserted, the upper housing part 16 can be transferred from the maintenance position back into the operating position, i.e., fitted onto the lower housing part 14, and normal suction operation may be continued.

Figure 4:
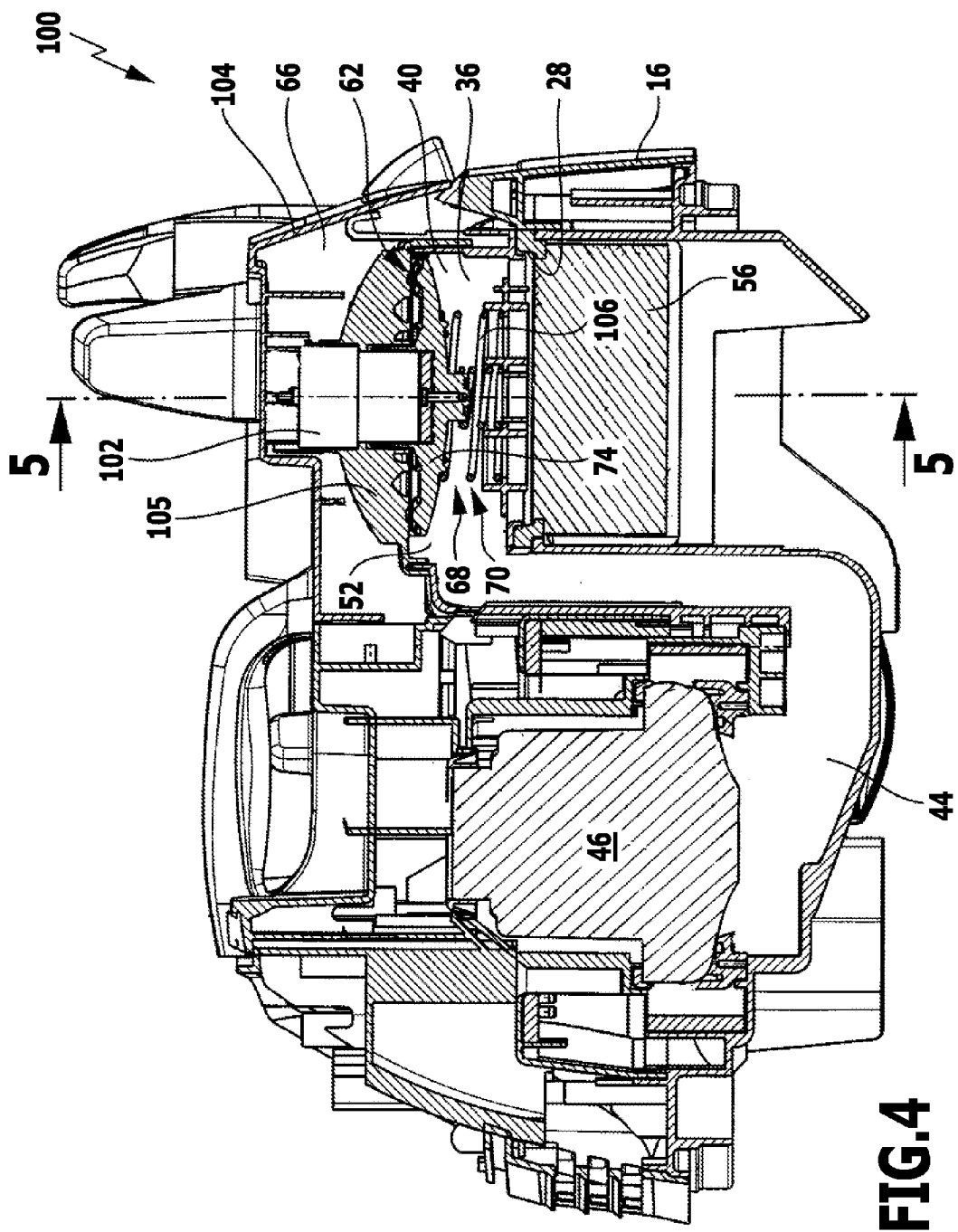
FIG. 4 shows a sectional view of an upper part of a second preferred embodiment of a suction device in accordance with the invention.
Figure 5:
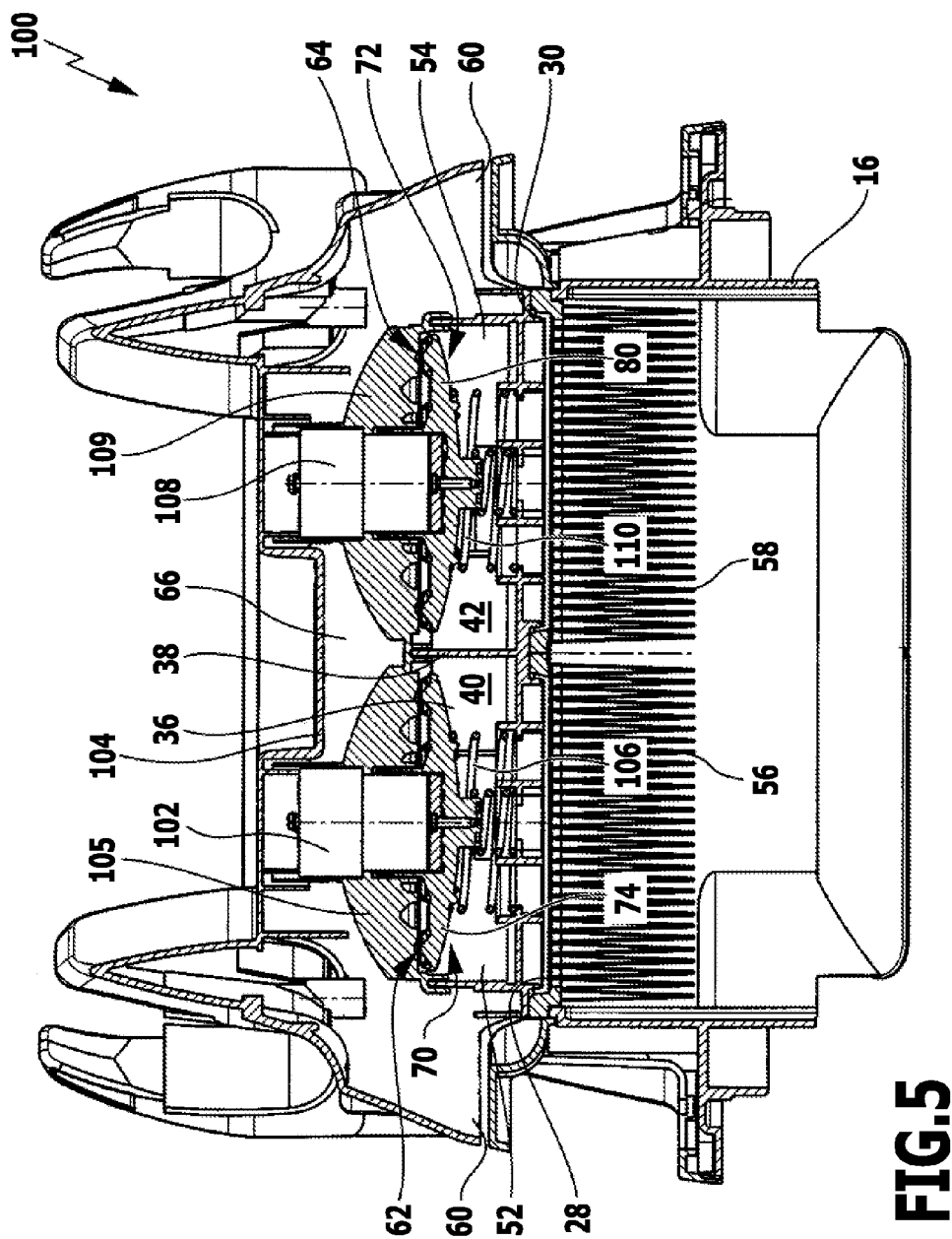
FIG. 5 shows a sectional view taken along line 5-5 in FIG. 4.

The upper housing part of a second embodiment of a suction device in accordance with the invention in the form of a vacuum cleaner given reference numeral 100 is shown in FIGS. 4 and 5, in sectional representation, in each case, and denoted therein by reference numeral 16. Components and features of the vacuum cleaner 100, which are identical to or act identically to components or features of the vacuum cleaner 10, are given the same reference numerals.

The upper housing part 16 of the vacuum cleaner 100 may be fitted onto a suitable lower housing part, which is known per se and, therefore, not shown in FIGS. 4 and 5, so as to form the vacuum cleaner 100 as a whole. Such a lower housing part is disclosed, for example, in international patent applications of the same applicant, which are published under numbers WO 2006/108459 A1 and WO 2008/014794 A1.

In the vacuum cleaner 100, the first suction unit 46 and the second suction unit 50, not shown in the drawings, are held on the upper housing part 16. The suction lines 52 and 54 are formed by the upper housing part 16. As in the case of the vacuum cleaner 10, the suction chamber 36 formed above the filters 56 and 58 is separated permanently by the partition wall 38 into two chamber regions sealed off from each other, chamber region 40 as part of the first suction line 52 and chamber region 42 as part of the second suction line 54.

The first closing valve 70 and the second closing valve 72 are each configured as an electromagnetic valve, as described, for example, in international patent applications of the same applicant, which are published under numbers WO 2006/108459 A1 and WO 2008/014794 A1. The first closing valve 70 comprises an electromagnet 102, which is supplied with current during normal suction operation of the vacuum cleaner 100, in order to hold the first valve body 74 in the closed position. To actuate the first closing valve 70, the supply of current to the electromagnet 102 is interrupted by the control unit 76, not shown in FIGS. 4 and 5. This has the consequence that owing to the pressure difference between the air in the first suction line 52 and the air in the external air channel 66 formed below a cover part 104 of the upper housing part 16, the first valve body 74 is subjected to compressed air on its upper side. This allows the first valve body 74 to be transferred to the open position in which it is lifted off from the first external air inlet 62 in the direction of the first filter 56. The first external air inlet 62 is formed on a valve holder 105 surrounding the electromagnet 102 in the shape of a ring. As described above, a pressure surge forms, to which the first filter 56 is subjected, in order to clean it.

The movement of the first valve body 74 from the closed position to the open position occurs counter to the action of a restoring member 106 of the first closing valve 70. The restoring member 106 takes the form of a helical spring and serves to transfer the first valve body 74 from the open position to the closed position. Once the first valve body 74 engages the first external air inlet 62 again, current is again supplied to the electromagnet 102 by the control unit 76 and, therefore, the first valve body 74 is again held in the closed position.

In a corresponding manner, the second closing valve 72 comprises an electromagnet 108 to hold the second valve body 80 in the second closed position, and a second restoring member 110 in the form of a helical spring to transfer the second valve body 80 from the open position to the closed position. The second external air inlet 64 is formed on a valve holder 109 surrounding the electromagnet 108 in the shape of a ring.

The first filter 56 and the second filter 58 can also be effectively cleaned with the vacuum cleaner 100 in the manner described in conjunction with the explanation of the vacuum cleaner 10 and, at the same time, sufficient negative pressure can be provided in the dirt collection container 24, not shown in the drawings, of the vacuum cleaner 100 to obtain an improved suction result.

The invention claimed is:

1. Suction device for cleaning purposes, comprising:
  a dirt collection container, which comprises a suction inlet,
  a first filter arranged at a first suction outlet,
  a second filter arranged at a second suction outlet,
  a first suction line and a second suction line, respectively following the first filter and the second filter, via which the dirt collection container can be subjected to negative pressure,
  a first external air inlet and a second external air inlet which allow external air to flow into the first suction line and into the second suction line, respectively, in order to subject the first filter and the second filter, respectively, to external air on a clean space side of the filters, and
  a first closing valve and a second closing valve for closing the first external air inlet and the second external air inlet, respectively,
  a first suction unit for subjecting the dirt collection container to the negative pressure via the first suction line and the first filter, and
  a second suction unit for subjecting the dirt collection container to the negative pressure via the second suction line and the second filter, and
  wherein:
    the first suction line and the second suction line are configured as suction channels that are spatially separated from each other and are sealed off relative to each other on the clean space side at least during cleaning of the first filter and the second filter,
    when the first closing valve is in an opened position, there is a fluid connection from the clean space side of the first filter to the first suction unit through the first suction line, and
    when the second closing valve is in an opened position, there is a fluid connection from the clean space side of the second filter to the second suction unit through the second suction line.

2. Suction device in accordance with claim 1, wherein the first suction line and the second suction line are permanently sealed off relative to each other in an area adjacent the clean space side of the filters.

3. Suction device in accordance with claim 1, further comprising a housing with a first housing part, which at least partially forms at least one of the first suction line and the second suction line.

4. Suction device in accordance with claim 1, further comprising a housing with a second housing part, which at least partially forms a wall of at least one external air channel, which opens via the first external air inlet into the first suction line.

5. Suction device in accordance with claim 1, further comprising a housing with a second housing part, which at least partially forms a wall of at least one external air channel, which opens via the second external air inlet into the second suction line.

6. Suction device in accordance with claim 1, wherein:
the first closing valve has a first valve seat and a first valve body,
the second closing valve has a second valve seat, and a second valve body, and
the first valve body and the second valve body are movable relative to the first valve seat and the second valve seat, respectively, and, in a closed position, sealingly engage the first valve seat and the second valve seat, respectively, and, in an open position, are lifted off from the first valve seat and from the second valve seat, respectively.

7. Suction device in accordance with claim 6, wherein:
the first closing valve comprises a first restoring member,
the second closing valve comprises a second restoring member, and
the first valve body and the second valve body, respectively, are transferable from the closed position to the open position counter to an action of the first restoring member and the second restoring member.

8. Suction device in accordance with claim 6, wherein:
the first closing valve comprises a first electromagnet,
the second closing valve comprises a second electromagnet, and
by an action of the first electromagnet and the second electromagnet the first valve body and the second valve body, respectively, are held in the closed position.

9. Suction device in accordance with claim 1, further comprising a control unit in electrical connection with at least one of the first closing valve and the second closing valve, with which control unit the first closing valve and the second closing valve, respectively, are controllable.

10. Suction device in accordance with claim 1, wherein the first suction unit and the second suction unit are arranged symmetrically relative to each other on the suction device in relation to a central longitudinal plane of the suction device.

11. Suction device in accordance with claim 1, wherein the first suction line and the second suction line are arranged symmetrically relative to each other on the suction device in relation to a central longitudinal plane of the suction device.

12. Suction device in accordance with claim 1, wherein the first closing valve and the second closing valve are arranged symmetrically relative to each other on the suction device in relation to a central longitudinal plane of the suction device.

13. Suction device in accordance with claim 9, wherein the control unit actuates the first closing valve and the second closing valve at different points in time.

14. Suction device in accordance with claim 9, wherein the control unit controls the first closing valve and the second closing valve such that the first closing valve and the second closing valve are not open at the same point in time.

15. Suction device in accordance with claim 9, wherein the control unit actuates at least one of the first closing valve and the second closing valve at prescribable intervals.

16. Suction device in accordance with claim 9, wherein the control unit controls at least one of the first closing valve and the second closing valve such that the at least one of the first closing valve and the second closing valve is opened for prescribable periods of time.

17. Suction device in accordance with claim 9, wherein the control unit actuates the first closing valve in dependence upon a pressure difference forming between the first suction line and the dirt collection container while the first closing valve is closed.

18. Suction device in accordance with claim 9, wherein the control unit actuates the second closing valve in dependence upon a pressure difference forming between the second suction line and the dirt collection container while the second closing valve is closed.

19. Suction device in accordance with claim 1, wherein the suction device forms part of a vacuum cleaner.

* * * * *